United States Patent [19]

Shiota

[11] Patent Number: 4,903,541
[45] Date of Patent: Feb. 27, 1990

[54] ANCHORING AND ADJUSTING ASSEMBLY FOR A CONTROL CABLE

[75] Inventor: Makoto Shiota, Ikeda, Japan

[73] Assignee: Nippon Cable System, Inc., Takarazuka, Japan

[21] Appl. No.: 382,373

[22] Filed: Jul. 20, 1989

[30] Foreign Application Priority Data

Aug. 24, 1988 [JP] Japan .................................. 63-210340

[51] Int. Cl.⁴ ............................................... F16C 1/10
[52] U.S. Cl. .............................. 74/501.5 R; 74/502.6; 74/501.6; 74/500.5; 403/105; 403/329
[58] Field of Search ................... 74/501.5 R, 501.5 H, 74/500.5, 502, 503, 501.6, 502.4, 502.6; 403/105, 325, 329; 192/111 A, 70.25, 30 W; 188/2 D, 196 B

[56] References Cited

U.S. PATENT DOCUMENTS

| 2,884,037 | 4/1959 | Stultz et al. ....................... 188/196 B |
| 3,062,071 | 11/1962 | Morrow ................................. 74/503 |
| 3,710,645 | 1/1973 | Bennett ............................. 74/502 X |
| 4,177,691 | 12/1979 | Filmore ........................... 74/501.5 R |
| 4,331,041 | 5/1982 | Bennett ........................... 74/501.5 R |
| 4,418,583 | 12/1983 | Taig ................................ 74/501.5 R |
| 4,610,180 | 9/1986 | Spease ............................... 403/105 X |
| 4,658,668 | 4/1987 | Stocker .......................... 74/501.5 R |
| 4,688,445 | 8/1987 | Spease et al. ....................... 74/502 X |
| 4,694,706 | 9/1987 | Lichtenberg et al. .......... 74/501.5 R |
| 4,841,806 | 6/1989 | Spease ............................. 74/501.5 R |

Primary Examiner—Vinh T. Luong
Attorney, Agent, or Firm—Armstrong, Nikaido, Marmelstein, Kubovick & Murray

[57] ABSTRACT

An anchoring and adjusting assembly for a control cable comprising a slider having a tubular shape, an end to be fixed to a conduit of the control cable, having an inner space through which an inner cable of the control cable is inserted and a set of ratchet teeth on an outer surface thereof, a holder having a fixing portion and a body formed with a through hole for supporting the slider for an axial sliding movement, a leaf spring having a cylinder-like shape with C-shaped cross section, and an engaging claw attached to the inside surface of the leaf spring and having a claw portion to be engaged with the set of ratchet teeth of the slider. The body of the holder has a cylindrical holding portion for supporting the leaf spring therearound and a hollow space to contain the engaging claw member at a bottom portion thereof.

4 Claims, 8 Drawing Sheets

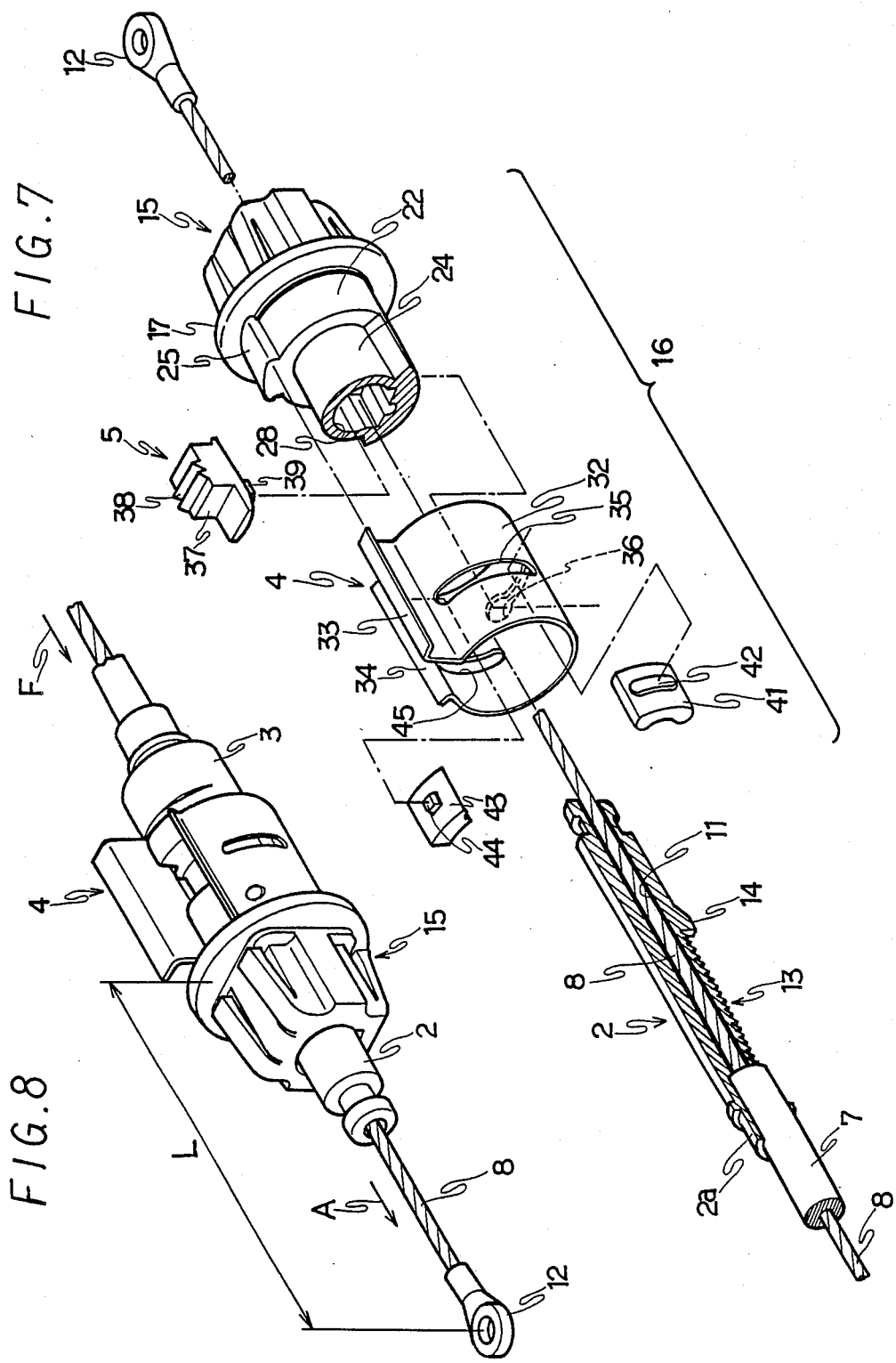

ANCHORING AND ADJUSTING ASSEMBLY FOR A CONTROL CABLE

BACKGROUND OF THE INVENTION

The present invention relates to an anchoring and adjusting assembly for a control cable, and more particularly, to an anchoring and adjusting assembly capable of adjusting an exact anchoring position of a control cable used to connect an accelerator pedal with a throttle valve of an automobile, a control cable used to connect a control lever with a control valve of a construction equipment, or the like.

Though typical examples to which the present invention is applied are automobiles, construction equipments and boats, the object is not limited to the above examples, and the present invention can be applied to any mechanical equipment in every industrial field if a control cable is used as a means to transmit an operational force and an anchoring position of the control cable is required to be exactly adjusted.

There has hitherto been known an anchoring and position-adjusting device for a control cable, for example, disclosed in Japanese Unexamined Patent Publication No. 246613/1987 (Prior Art I) and Japanese Unexamined Patent Publication No. 63212/1987 (Prior Art II).

The device of the Prior Art I is hereinafter explained with reference to FIGS. 10 through 12. In the device, a conduit 110 of a control cable is fixed to an end of a tubular member 114, and an adjusting member 115 is inserted to the inside space of the tubular member 114. An inner core 113 is extended out of the conduit 110, is passed through an inner hole of the adjusting member 115 and extends towards the end direction. On both lateral sides of the adjusting member 115, ratchet teeth 116, 117 are provided, respectively. Two movable teeth members 119 are provided on the tubular member 114 so as to opposing each other, and are situated at the positions corresponding to the above-mentioned ratchet teeth 116, 117 so that the teeth members 119 can mesh with the ratchet teeth. Further, the two teeth members 119 are bound with two ring-like springs 120, and are urged against the outside surface of the tubular member 114. In the above mentioned device, the tubular member 114 alone can be moved relative to the previously fixed adjusting member 115, and further, both members, i.e. the tubular member 114 and the adjusting member 115, can be moved after each conduit of the control cables are attached on each end of the tubular member 114 and the adjusting member 115 for adjusting the relative positions.

As shown in FIG. 10 and FIG. 11, when the above-mentioned teeth members 119 are meshed with the ratchet teeth 116 and 117, the tubular member 114 (or the adjusting member 115) cannot move ahead (to the right direction in FIG. 10 for the adjusting member). On the contrary, as shown in FIG. 12, when the adjusting member 115 is manually rotated in the angle of 90°, the tubular member 114 (or the adjusting member 115) can move in the front (in the rear) direction along the axis. Then, the anchoring position can be adjusted since the teeth members 119 do not mesh with the ratchet teeth 116, 117. After the anchoring position is adjusted, the adjusting member 115 is rotated in the angle of 90° again to the original position, and therefore, the relative movement between the tubular member 114 and the adjusting member 115 is restricted since the teeth member 119 mesh with the ratchet teeth 116, 117. Then adjustment of the position is finished.

Next, a device of the Prior Art II is explained hereinafter with reference to FIG. 13.

In the device, an adjusting member 232 is inserted in a cylindrical support member 222 in a movable state along an axis thereof, and an end of a conduit 212 is connected to the adjusting member 232. An inner core 216 is extended ahead through an inside cavity of the adjusting member 232. In addition, ratchet teeth 258 extending in the axial direction are formed on the lower surface of the adjusting member 232. A box-like protective wall 254 projecting largely in the radial direction is provided on a support member 222, and two plate-like latches 240, 242 are inserted movably in the transverse direction relative to the adjusting member 232 in the protective wall 254. Opening portions 244, 246 are formed in the latches 240, 242 for inserting the adjusting member 232, and tooth portions 260, 262 are formed on the bottom edge surface of the opening portion 244, 246, respectively. A cap 252 is attached between the upper portions of the latches 240, 242, and a coil spring 256 is inserted between the cap 252 and the support member 222.

At a normal state, the tooth portions 260, 262 of the latches 240, 242 and the rachet teeth 258 are meshed with each other by means of an elastic force of the coil spring 256, and the adjusting member 232 cannot move forward (to the right direction in FIG. 13). When the cap 252 is pushed down by a hand, engagement between the tooth portions 260, 262 and the ratchet teeth 258 are released and the adjusting member 232 becomes to be movable in the front and rear directions. Therefore, in order to adjust the anchoring position of the control cable, the adjusting member 232 is moved in the front and rear direction after the cap 252 is depressed.

In the Prior Art II, a temperature-detector 264 is inserted between the cap 252 and the surport member 222, so that large resisting force is applied against the movement of the latchs 240, 242 when the surrounding temperature goes down to a predetermined value.

In the above-mentioned Prior Art I, the adjusting member 115 must be rotated two times in order to adjust the position. Accordingly, the adjusting is troublesome. In addition, in case that the adjusting member 115 is not sufficiently rotated in the return direction after the adjustment is finished, the engagement between the teeth member 119 and the ratchet teeth tends to be disengaged, and in this case an unforeseen accident that the adjusting position is unexpectedly loosen will happen.

In the above-mentioned Prior Art II, since the latches 240, 242 and the spring 256 are largely projected in the radial direction from the surface of the support member 222, there is a problem that an occupancy space is large.

In addition to the above-mentioned, since the contour of the device is unsymmetrical in relation to the axis, the space beyond an actual occupancy space is demanded in order to secure the setting space. Especially, the above-mentioned problem tends to be raised when the device is installed in an engine compartment of an automobile or the like, since an inner arrangement is complex, a surplus space is small and the arrangement of the surplus spaces are not in good order in the engine compartment. Further, it is very difficult for an operator to move the adjusting member 232 while pushing the cap 252 after confirming the cap 252 and his finger tip with his eyes in order to adjust the position in such a narrow space.

Under the above-mentioned circumstances, the main object of the present invention is to provide an anchoring and adjusting assembly capable of adjusting an anchoring position for a control cable, in which the adjusting operation is easy, the fixed position after adjusting is secure, the occupancy space is small, and the configuration is symmetric with regard to the center axis so that a large fitting space is not required.

SUMMARY OF THE INVENTION

The anchoring and adjusting assembly for a control cable of the present invention comprises, (a) a slider having a tubular shape, having an end to be fixed to a conduit of a control cable, having an axially extending inside space through which an inner cable of the control cable is inserted and formed with a set of ratchet teeth on an outer surface thereof;

(b) a holder having a fixing portion to be fixed to a static member and a body for holding an engaging claw and a leaf spring member; the body being formed with a through hole having an inside surface supporting the slider for an axial sliding movement;

(c) the leaf spring member having a spring portion formed into a cylinder-like shape with C-shaped cross section and having a certain width in an axial direction;

(d) the engaging claw member engaged with an inside surface of the spring portion and having a claw portion to be engaged with the ratchet teeth of the slinder; and (e) the body of the holder having a cylindrical holding portion for supporting the spring portion of the leaf spring member therearound and having a hollow space formed in a bottom portion of the holding portion to contain the engaging claw member.

In the present invention, when the anchoring assembly is attached to a static member, such as a frame, and a tension force is applied on an inner cable of a control cable, the conduit is pushed with the reaction force and the slinder is pushed ahead.

When a pushing force for the slinder is balanced with a resistant force required for the ratchet teeth to depress the engaging claw and get over it, the movement is stopped and, at the same time, the anchoring position can be adjusted without causing excessive compressive force in the conduit. In the above-mentioned present invention, since the leaf spring has an almost cylindrical shape, and the engaging claw and the slider are situated in the inside area of the leaf spring, the whole external apperance assumes a slim cylindrical shape, requires only narrow occupancy space, and has a symmetrical form in sectional shape. Therefore, the total space required for operation of anchoring the control cable is small.

BRIEF DESCRIPTION OF THE DRAWINGS

The features and advantages of the anchoring and adjusting assembly for a control cable of the present invention will become more clearly appreciated from the following descriptions in conjunction with the accompanying drawings, in which:

FIG. 7 is a exploded perspective view of the assembly of FIG. 1 with showing a cross section of the holder taken along the line VII—VII in FIG. 3;

FIG. 8 is a perspective view of the anchoring assembly of FIG. 7 after assembled;

DETAILED EXPLANATION OF THE INVENTION

Hereinafter, an embodiment of the assembly of the present invention is explained.

Figure 1:
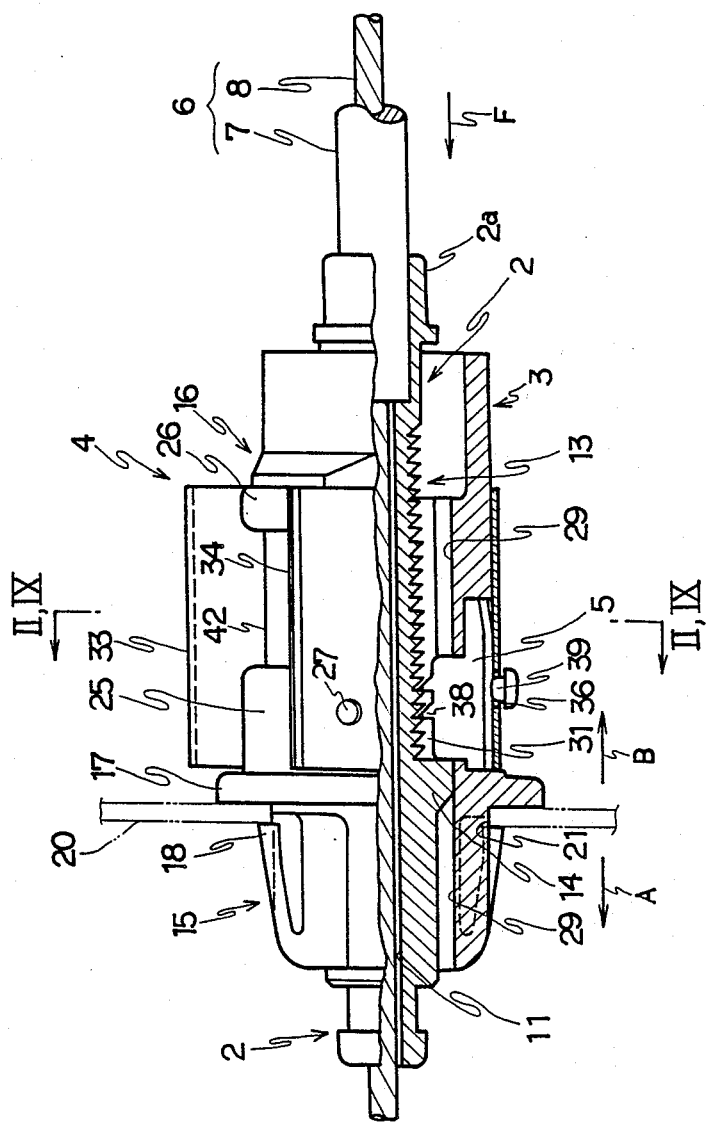
FIG. 1 is a partially cross-sectional front view showing an embodiment of the anchoring assembly of the present invention.

Firstly, there is explained a whole construction of an anchoring and adjusting assembly with reference to FIG. 1. In FIG. 1, the reference numeral 2 denotes a slider, the numeral 3 denotes a holder, the numeral 4 denotes a leaf spring, and the numeral 5 denotes an engaging claw, respectively.

The slider 2 is a hollow cylindrical member as shown in FIGS. 1 and 7 and has a hollow portion 11 extending along an axis thereof. A conduit 7 of a control cable 6 is connected with a base portion 2a of the slider 2, and an inner cable or inner core 8 extending out of the conduit 7 goes through the hollow portion 11 and projects out of an end of the slider 2. Further, an end fitting (shown by 12 in FIG. 8) is engaged with the end of the inner core 8. Also, a set of ratchet teeth 13 is formed along the axis on the outer bottom surface of the slider 2. Each tooth of the ratchet teeth 13 has an inclination surface at the front side and a vertical surface at the rear side.

A key portion 14 is formed at a position adjacent to the front end portion of the set of ratchet teeth 13.

Next, the holder 3 will be explained with reference to FIGS. 3 through 6. The holder 3 has two portions as main parts, i.e. a fitting portion 15 and a body 16. Further, instead of the fitting portion 15, a conduit fixing portion can be provided to fix another or additional conduit so as to extend toward the opposite direction (not shown). In the special case, the anchoring assembly according to the present invention is used by inserting it on the middle way of the conduit.

Figure 3:
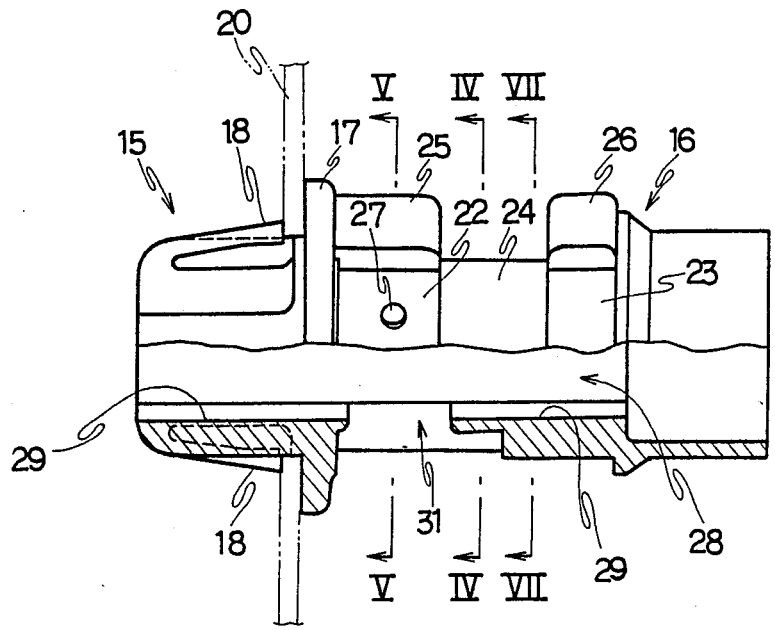
FIG. 3 is a partially-cut-off front view of the holder shown in FIG. 1.
Figure 5:
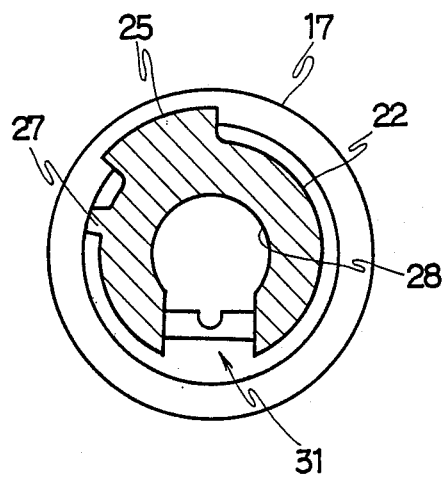
FIG. 5 is a cross-sectional view taken along the line V—V in FIG. 3.
Figure 6:
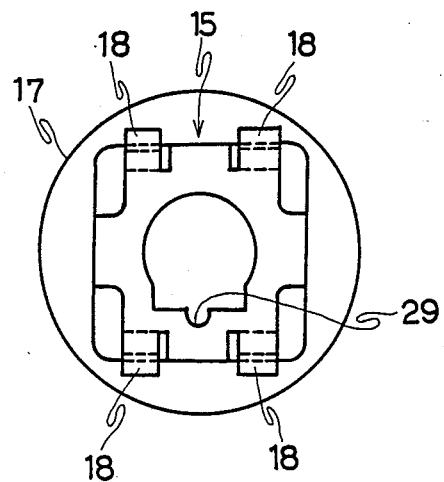
FIG. 6 is a left side view of the holder of FIG. 3.

Referring to FIG. 3, a flange 17 is formed at a somewhat left side from the center portion. The above-mentioned fitting portion 15 is located on the left hand side (in the drawing) of the flange, while the body 16 is located on the right hand side. As shown in FIG. 3 and FIG. 6, the fitting portion 15 is formed with four snap pieces 18 provided on the upper and lower surfaces of a box-like block. The assembly 1 is fixed to a bracket 20 or the like by gripping the bracket 20 with the snap pieces 18 and the flange 17. As shown in FIG. 3 and FIG. 5, the body 16 has holding portions 22 and 23. The holding portions 22 and 23 are separately located along the axis, and are connected with each other through a small diameter portion 24 mentioned later. Each holding portion 22 and 23 has a cylinder-like outside surface for supporting the cylindrical leaf spring 4 thereon in the closed state. In addition, protruding portions 25 and 26 slightly projected in the radial direction are formed on both upper portions of the holding portions 22 and 23. Those protruding portions 25 and 26 serve as a whirl-stop for the leaf spring 4. Further, a small engaging projection 27 is formed on one side of the holding portion 22 in order to engage the leaf spring 4.

Figure 4:
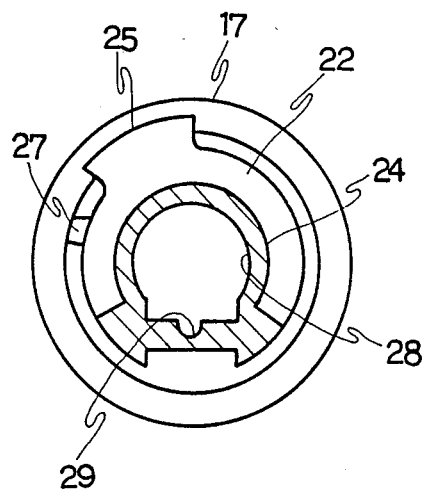
FIG. 4 is a cross-sectional view taken along the line IV—IV in FIG. 3.

The above-mentioned small-diameter portion 24 is formed with smaller diameter than the holding portions in the upper side (about ⅔ of the whole area), and is formed with the same diameter as the holding portions 22 and 23 in the remaining part (about ⅓) as clearly shown in FIG. 4, in order to provide a space to contain an absorber 41 and a bush 42 described later.

A through hole 28 extending in the axial direction is formed in the above-mentioned holder 3, so that the above-mentioned slider 2 is inserted in the through hole 28. Further, the holder 3 is formed with a key way 29 extending in the axial direction in the inside bottom surface of the hole 28. The above-mentioned key portion 14 of the slider 2 is inserted in the key way 29 so as to restrict rotation of the slider 2 around the axis thereof. Therefore, the slider 2 can move only in the axial direction of the holder 3. Also, as shown in FIG. 3 and FIG. 5, a hollow space or a radial hole 31 is formed in the lower part of one of the holding portion 22. The hollow space 31 is used to contain the engaging claw 5 as shown in FIG. 1.

The leaf spring 4 and the engaging claw 5 are clearly shown in FIG. 7. The leaf spring 4 has a spring portion 32 having cylindrical appearance, C-shaped cross section, and a wide width in the axial direction. For example, the width is the same as the diameter of the spring portion 32. The leaf spring 4, for example, can be made by forming a sheet metal.

Since the spring portion 32 has a gap or slit at the upper portion thereof in order to make a clearance for elastic deformation, the appearance is not perfect cylindrical shape. However, the spring portion has substantially cylindrical shape except the slit portion.

Further, a pushing-portion 33 having an L-shaped section is formed on an end of the spring portion 32 by bend-forming. Also, an abutting end portion 34 is formed by bend-forming on another end. A slit or elongated hole 35 for attaching the bush 43 and the absorber 42 is formed in the circumferential direction in the spring portion.

Another slit hole 45 having the same shape as the slit hole 35 is provided at a position opposite to the slit hole 35. The slit hole 45 is formed merely for balancing the resilient force and deformation of the spring portion 32 in the right and left sides. Further, an engaging hole 36 for engaging with an engaging claw is formed at the bottom portion of the spring portion 32.

The engaging claw 5 comprises a block 37, a claw portion 38 with two teeth provided on the upper surface of the block 37, and an engaging pin 39 provided on the lower surface of the block 37. After the engaging pin 39 is inserted through the engaging hole 36 of the leaf spring 4, the engaging claw 5 is housed in the hollow space 31 of the holder 3 when the leaf spring 4 is assembled as shown in FIG. 1.

Referring to FIG. 7, the numeral 41 is an absorber. The absorber 41 is a synthetic resin or rubber piece having an arc-shape in section. When assembled, the absorber 41 is closed on the outside surface of the small-diameter portion 24. The absorber has a width the same as the length of the small-diameter portion 24.

A guide projection 42 to be inserted through the slit hole 35 of the leaf spring 4 is formed on the outer surface of the absorber. The absorber can be made of any material having flexibility and a heat-characteristic in which hardness becomes harder when an outer temperature goes down. For example, urethane elastomer of durometer hardness $H_A$ 30 to 50, preferably about 40 (ASTM D2240) is used in the present embodiment.

Referring to FIG. 7, the numeral 43 denotes a bush. The bush 43 is a member having an arc-shaped configuration and is closed on the outside surface of the small-diameter portion 24, and has a width the same as the length of the small-diameter portion 24. An engaging protrusion 44 to be inserted through t slit hole 35 of the leaf spring 4 is formed on the outer surface of the bush 43. However, the bush 43 is a piece made of metal or the like and is not flexible.

Figure 2:
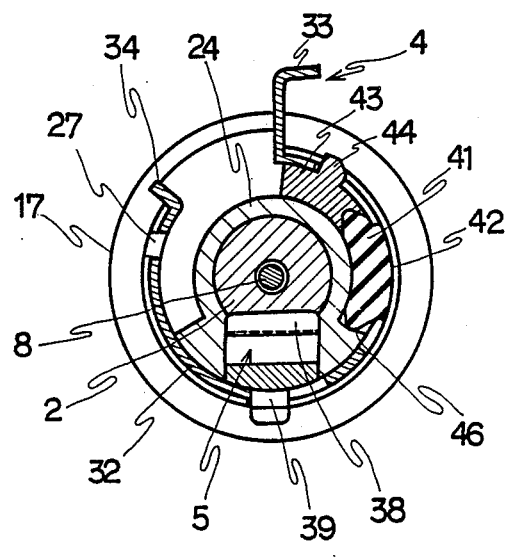
FIG. 2 is a cross sectional view taken along the line II—II in FIG. 1.

In FIG. 2, the body 16 of the holder 3 is shown together with the leaf spring 4, the absorber 41 and the holder 3 in the assembled state. As shown in the drawing, the absorber 41 and the bush 43 are housed in the space between the outside surface of the small-diameter portion 24 and the spring portion 32 of the leaf spring 4. When no external force is applied against the leaf spring 4, the engaging claw 5 is held with the leaf spring 4 in an engageable position where the engaging claw 5 can mesh with the ratchet teeth 13 of the slider 2.

In the state, the slider 2 cannot be moved in the rear direction (mentioned by arrow B in FIG. 1). However, the slider 2 can be moved with a strong stressing force in the forward direction (mentioned by A in FIG. 1). Such function can be obtained since the claw portion 38 abuts with the ratchet teeth 13 at the slant surface of the teeth, i.e. at the slidable side, and the absorber 41 can be compressed to allow downward deformation of the spring portion 32 of the leaf spring 4.

Figure 9:
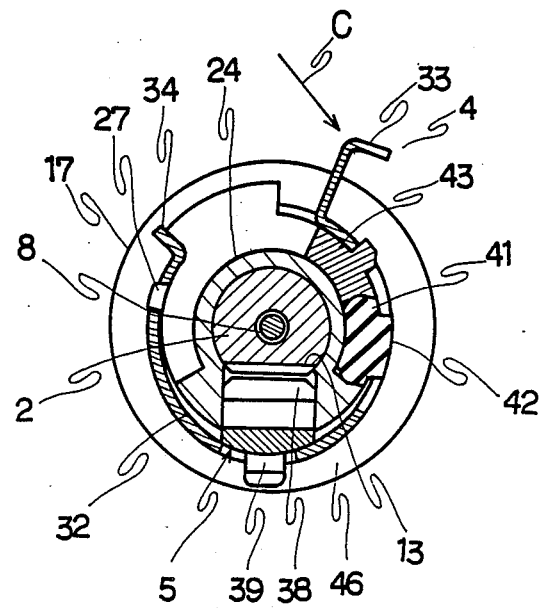
FIG. 9 is a cross-sectional view taken along the line IX—IX in FIG. 1 where the leaf spring is deformed with a hand.
Figure 10:
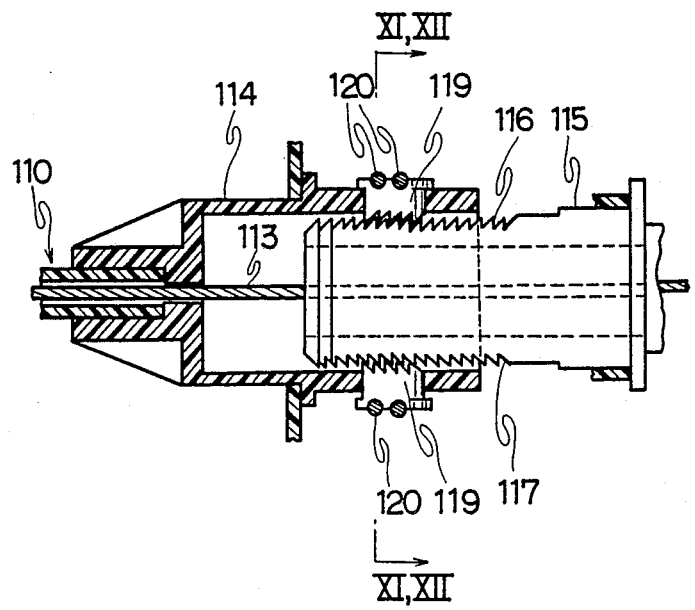
FIG. 10 is a longitudinal sectional view showing an example of Prior Art I.
Figure 11:
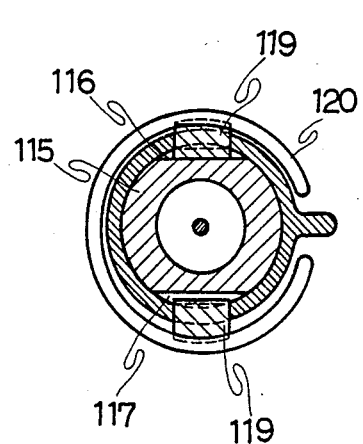
FIG. 11 is a cross-sectional view taken along the line XI—XI in FIG. 10.
Figure 12:
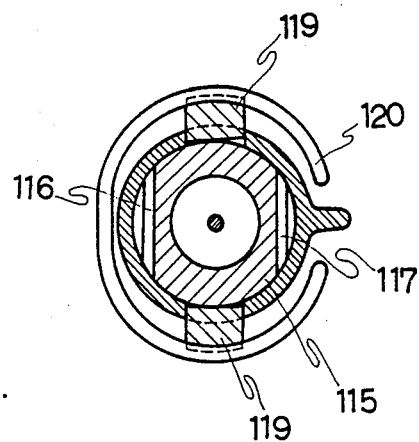
FIG. 12 is a cross sectional view take along the line XII—XII in FIG. 10 where an adjusting member is turned in an angle of 90° and FIG. 13 is a longitudinal sectional view showing an example of Prior Art II.
Figure 13:
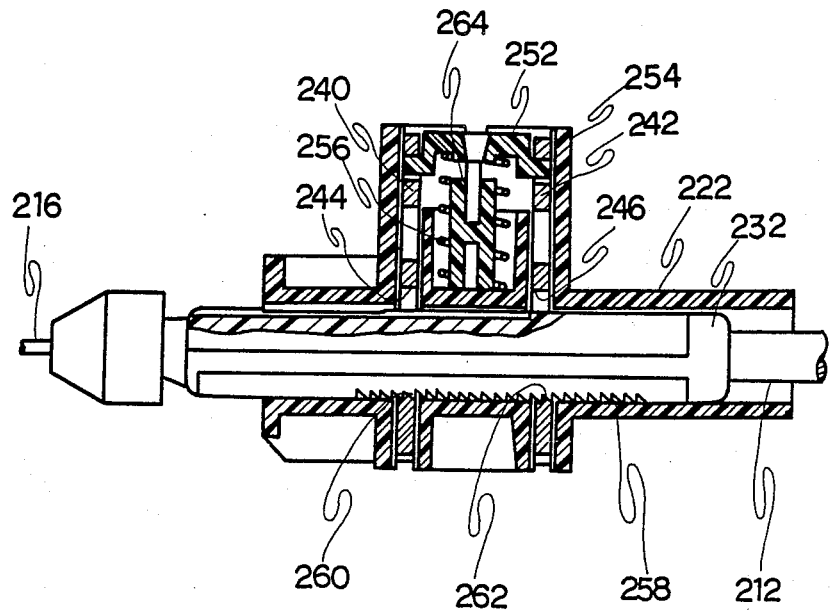

Next, as shown in FIG. 9, when the pushing portion 33 of the leaf spring 4 is depressed by a hand (in the direction of arrow B), the force is transmitted to the absorber 41 through the bush 43, and the absorber 41 is compressed. As a result, the spring portion 32 is pressed down to move the engaging claw 5 down, so that the engagement between the ratchet teeth 13 and the claw portion 38 is released. In the above-mentioned state, the slider 2 can be moved forward with light force.

Hereinafter, setting method and position-adjusting method for the above-mentioned device will be explained.

Firstly, the fixing portion 15 is inserted into the inserting hole 21 of the bracket 20, i.e. a member to which the assembly is to be attached. Then, the holder 3 is fixed since the snap pieces 18 and the flange 17 grip the bracket (see FIG. 1).

Next, as shown in FIG. 8, the head end of the inner core 8 is pulled out in the front direction (arrow A), and the end fitting 12 is connected with another member (not shown) with keeping a predetermined distance L. Since the pulled-out inner core 8 is applied with tension force at the above-mentioned operation, the conduit 8 receives a compression force to press out when the conduit is arranged in a curved state.

Hereinafter, the compression force is denoted as "F", and the adjusting operation will be explained with reference to FIG. 1.

The ratchet teeth 13 of the slider 2 engages with the claw portion 38 of the engaging claw 5 so that the slider can slide in the direction of the compression force F. Therefore, the slider 2 can move ahead with depressing the engaging claw 5. However, when the compression force becomes to balance with the radially depressing force for the engaging claw 5, i.e. the compression resistant force, the motion in the front direction automatically comes to stop. At the present state, the anchoring position of the conduit 7 is automatically and naturally adjusted, and then, no excessive tension is caused in the inner core 8.

As shown in FIG. 9, when the pushing portion 33 of the leaf spring 4 is depressed with a finger in the direction mentioned by arrow C, as explained above, the slider 2 can be freely moved since the engaging claw 5 and the ratchet teeth 13 are disengaged. Therefore, if the first trial of adjustment is not suitable, the operator can adjust the anchoring position again by manually moving the slider 2 according to the above-described method.

When the assembly of the present invention is used in a region where temperature suddenly goes down due to change of weather or the like, a problem happens after the assembly is attached and operation begins. That is to say, in case that rain drops enter in the conduit 7 for the worst, the rain drops freeze when temperature goes down. Then, sliding resistance of the inner core 8 becomes very large, and as a result, the conduit 7 is urged in the direction of arrow F of FIG. 1 due to the same function as that of the adjusting operation mentioned above. Therefore, if the absorber 41 is compressed to allow the motion of the slider in the axial direction, the conduit 7 is pressed in the direction of arrow F and the effective length of the conduit is shortened. Therefore, a slack is caused in the inner core 8 after the atmospheric temperature rises.

In the above-mentioned assembly of the embodiment of the present invention, the absorber 41 is made of polyurethane which has a characteristic that the hardness becomes harder when atmospheric temperature falls. Therefore, even when atmospheric temperature falls, the absorber 41 becomes harder and compression deformation does not be easily caused in the absorber 41. As a result, since the leaf spring 4 cannot be deformed, the ratchet teeth 13 are not disengaged from the engaging claw 5 and the motion of the slider is restricted.

Next, advantageous features of the above-mentioned embodiment will be explained.

The assembly of the present embodiment has a slim appearance and does not require large occupancy space. In addition to the slim shape, the assembly has a substantially axial symmetric shape, and therefore, the assembly can be attached to a narrower space in comparison with the conventional devices. Further, since the leaf spring 4 is held by means of the elastic force of itself so as not to get off from the holder 3, any additional spring supporter or the like is not required and the construction is more simple in comparison with the conventional device using a coil spring or the like. Further, the leaf spring has high strength. Since the body 16 of the holder has a small-diameter portion 24 having a diameter smaller than that of the holding portion 22, a space for containing an absorber 41 and a bush 43 is provided between the small-diameter portion 24 and the leaf spring 4. Therefore, a small external shape can be obtained. Further, since the leaf spring can have a wide width and a large pushing portion 33, it is comparatively easy to operate the assembly even if the assembly is attached to a sequestered position where the operator cannot directly see the pushing portion 33 with his naked eye.

As mentioned above, the anchoring and adjusting assembly for the control cable of the present invention requires only small occupancy space, and has a simple construction and high strength. Further, the operation is easy.

Though a suitable embodiment of the present invention is described above, it is to be understood that the present invention is not limited to the above-mentioned embodiment, and various changes and modifications may be made in the invention without departing from the spirit and scope thereof.

What we claim is:

1. An anchoring and adjusting assembly for a control cable comprising:
   (a) a slider having a tubular shape, an end to be fixed to a conduit of a control cable, an axially extending inner space through which an inner cable of the control cable is inserted and a set of ratchet teeth on an outside surface thereof;
   (b) a holder having a fixing portion to be fixed to a static member and a body for holding an engaging claw and a leaf spring member; said body being formed with a through hole having an inside surface supporting the slider for an axial sliding movement;
   (c) said leaf spring member having a spring portion formed into a substantially cylinder-like shape with C-shaped cross section and having a certain width in an axial direction,
   (d) said engaging claw member engaged with an inside surface of the leaf spring portion, and having a claw portion to be engaged with the set of ratchet teeth of the slider; and
   (e) said body of the holder having a cylindrical holding portion for engaging the spring portion of the leaf spring member therearound and having a hollow space formed in a bottom portion of the holding portion to contain the engaging claw member.

2. An anchoring assembly for a control cable comprising:
   (a) a slider having a hollow space for inserting an inner cable, a conduit-fixing portion at an end thereof and an outside surface on which a set of ratchet teeth axially aligned is formed;
   (b) a tubular holder having an axially extending hole to insert the slider for axial sliding movement and an outside surface provided with a spring engaging portion and a radial hole communicating an inside of the axial hole with an outer side; said radial hole situated at an opposite side with respect to a center axis of the holder;
   (c) a leaf spring having a spring portion with C-shaped cross section, having an end engaged with the spring-engaging portion of the holder and having a pushing portion provided on another end of the spring portion for pushing the spring portion in a tangential direction of the spring portion; and
   (d) a claw member contained in the radial hole of the holder for radial movement, having a claw portion to be engaged with the set of ratchet teeth of the holder at an inside surface thereof and having an outside surface abutting with an inside surface of the spring portion.

3. The anchoring assembly of claim 2, wherein said holder is provided with a recessed portion with a radial face; and said anchoring assembly further comprising an elastomeric absorber inserted in the recessed portion so as to abut with the radial face at an end thereof and a bush inserted in the recessed portion so as to abut with another end of the absorber; the bush being carried on the inside surface of the spring portion.

4. The anchoring assembly of claim 2, wherein said spring portion of the leaf spring has an elongated hole extending in a circumferential direction and said engaging claw member is carried with side edges of the elongated hole to allow relative circumferential motion.

* * * * *